United States Patent
Ma

(10) Patent No.: US 11,094,084 B2
(45) Date of Patent: Aug. 17, 2021

(54) IMAGE PROCESSING METHOD

(71) Applicant: AVerMedia TECHNOLOGIES, INC., New Taipei (TW)

(72) Inventor: Hsiang-Yi Ma, New Taipei (TW)

(73) Assignee: AVerMedia TECHNOLOGIES, INC., New Taipei (TW)

( * ) Notice: Subject to any disclaimer, the term of this patent is extended or adjusted under 35 U.S.C. 154(b) by 118 days.

(21) Appl. No.: 16/372,429

(22) Filed: Apr. 2, 2019

(65) Prior Publication Data

US 2019/0333247 A1    Oct. 31, 2019

(30) Foreign Application Priority Data

Apr. 30, 2018  (TW) ................................. 107114735

(51) Int. Cl.
  *G06T 7/90*    (2017.01)
  *G06T 5/00*    (2006.01)
(52) U.S. Cl.
  CPC ............... *G06T 7/90* (2017.01); *G06T 5/007* (2013.01); *G06T 2207/10024* (2013.01); *G06T 2207/20208* (2013.01)
(58) Field of Classification Search
  CPC ...................................................... G06T 5/007
  See application file for complete search history.

(56) References Cited

U.S. PATENT DOCUMENTS

| | | | |
|---|---|---|---|
| 2005/0117799 A1 | 6/2005 | Fuh et al. | |
| 2014/0307129 A1* | 10/2014 | Feng | H04N 5/3572 348/242 |
| 2016/0132745 A1* | 5/2016 | Falb | G06K 9/6201 348/148 |
| 2016/0241808 A1* | 8/2016 | Hamada | H04N 5/765 |
| 2017/0026627 A1* | 1/2017 | Toma | G09G 5/10 |
| 2017/0064334 A1* | 3/2017 | Minoo | H04N 1/64 |
| 2019/0073982 A1* | 3/2019 | Kanda | H04N 9/77 |
| 2019/0139201 A1* | 5/2019 | Eto | G06T 5/009 |
| 2019/0287494 A1* | 9/2019 | Yokota | G06T 5/009 |
| 2019/0333247 A1* | 10/2019 | Ma | G06T 7/90 |
| 2020/0296323 A1* | 9/2020 | Endo | H04N 7/0125 |

FOREIGN PATENT DOCUMENTS

| | | |
|---|---|---|
| CN | 107409191 A | 11/2017 |
| CN | 107786891 A | 3/2018 |

* cited by examiner

*Primary Examiner* — Edward Park
(74) *Attorney, Agent, or Firm* — CKC & Partners Co., LLC

(57) ABSTRACT

An image processing method includes receiving an image source, and detecting whether the image source is a high dynamic range (HDR) image. If the image source is the HDR image, reading a first image adjustment value, and performing color adjustment to the image source according to the first image adjustment value.

13 Claims, 2 Drawing Sheets

IMAGE PROCESSING METHOD

CROSS-REFERENCE TO RELATED APPLICATION

This application claims priority to Taiwan Application Serial Number 107114735, filed Apr. 30, 2018, which is herein incorporated by reference in its entirety.

BACKGROUND

Field of Invention

The present invention relates to an image or a video processing method. More particularly, the present invention relates to an image or a video processing method for color adjustment.

Description of Related Art

Nowadays, an image or a video with a high dynamic range (HDR) format has been widely accepted by front-end image source devices. For example, a PlayStation 4 (PS4) host is able to output and support a video game with a HDR format.

However, when the back-end receiving device, e.g. a display device, is unable to support displaying a HDR image, the image quality of the image displayed on the display device will be deviated. (For example, the brightness is dark.)

SUMMARY

The invention provides an image processing method for color adjustment to solve the color deviation problem.

According to an embodiment of the disclosure, the image processing method includes receiving an image source, and detecting whether the image source is a high dynamic range (HDR) image. If the image source is a HDR image, reading a first image adjustment value, and performing color adjustment to the image source according to the first image adjustment value.

In an embodiment of the disclosure, the method further includes if the image source is a non-HDR image, reading a second image adjustment value, and performing color adjustment to the image source according to the second image adjustment value.

In an embodiment of the disclosure, the second image adjustment value includes at least one of a brightness value, a contrast value, a saturation value, and a hue value.

In an embodiment of the disclosure, the method further includes converting the image source from the HDR image to a non-HDR image after performing color adjustment to the image source according to the first image adjustment value.

In an embodiment of the disclosure, performing color adjustment to the image source includes performing color adjustment to the conversion of the HDR image according to the first image adjustment value.

In an embodiment of the disclosure, the method further includes converting the image source from the HDR image to a non-HDR image before performing color adjustment to the image source according to the first image adjustment value.

In an embodiment of the disclosure, performing color adjustment to the image source includes performing color adjustment to the conversion of the non-HDR image according to the first image adjustment value.

In an embodiment of the disclosure, the method further includes enabling image capture function to record the adjusted image source.

In an embodiment of the disclosure, the method further includes enabling image capture function to record the image source before performing color adjustment to the image source according to the first image adjustment value.

In an embodiment of the disclosure, the method further includes displaying a preview image of the image source on a display device.

In an embodiment of the disclosure, the method further includes displaying a preview image of the image source on a display device, and determining whether the display device supports displaying the HDR image. If the display device does not support displaying the HDR image, converting the image source from the HDR image to a non-HDR image.

In an embodiment of the disclosure, the first image adjustment value includes at least one of a brightness value, a contrast value, a saturation value, and a hue value.

In an embodiment of the disclosure, the method further includes continually detecting whether the image source is changed.

Accordingly, if the received image source is a HDR image, according to the image processing method of the present disclosure, read a first image adjustment value. According to the first image adjustment value, perform the color adjustment to the display device or to the image source. As such, the color deviation problem of the image can be solved.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
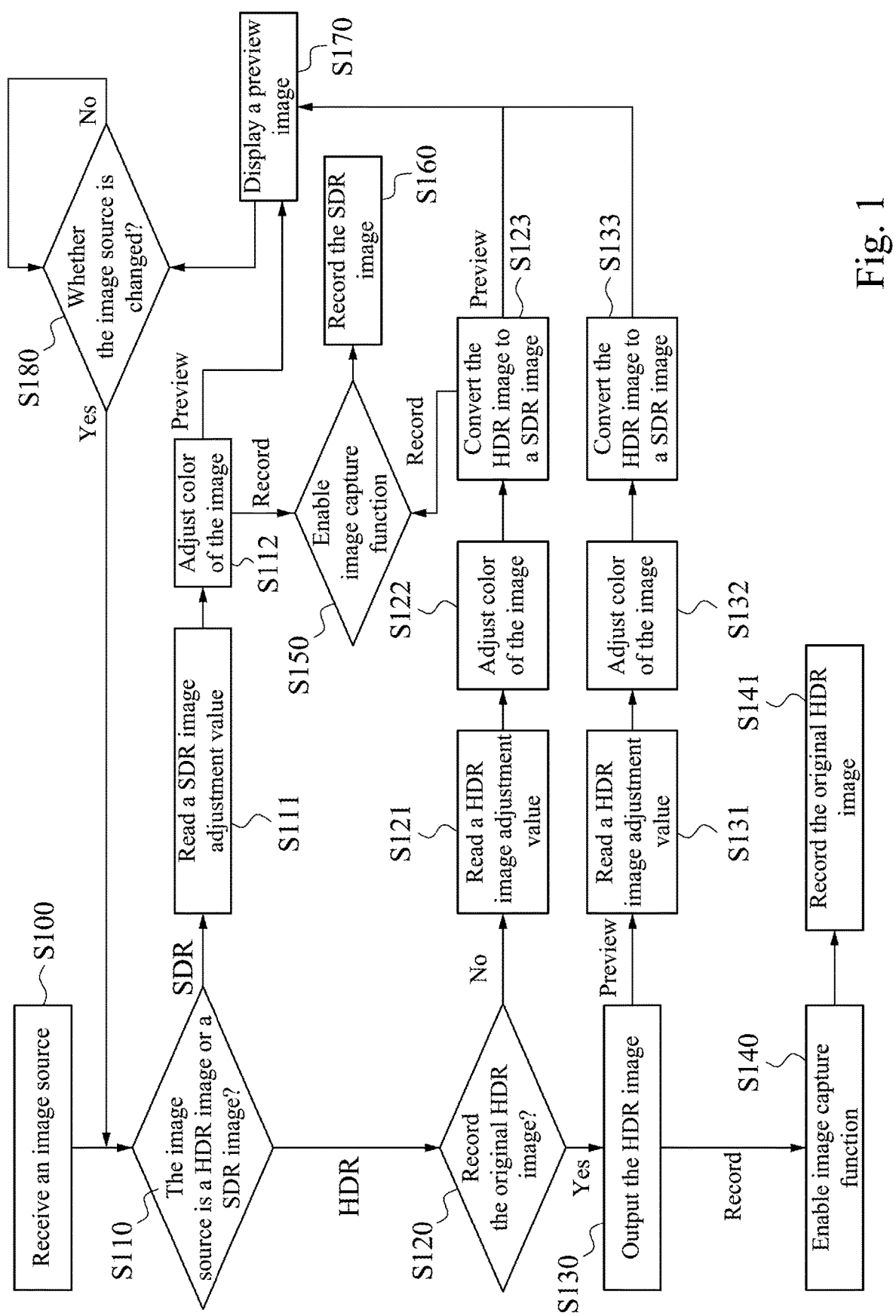
FIG. 1 is a flow chart of an image processing method according to an embodiment of the disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1. FIG. 1 is a flow chart of an image processing method according to an embodiment of the disclosure. As shown in FIG. 1, in the embodiment, the image processing method includes step S100 to step S180. The image processing method may be operated by one or more image playback device, software, and/or hardware according to actual needs. The disclosure should not be limited in this regard.

In step S100, an image capturing device receives an image source. In some embodiments, the image capturing device may be any suitable device that can implement an image capturing function, such as a computer device, a frame grabber, or the like, but the disclosure should not be limited in this regard. In addition, the received image source may be a stream of signal including image frames, such as image signals or video signals, but the disclosure should not be limited in this regard. Furthermore, the image source may be a high dynamic range (HDR) image or a non-HDR image. In some embodiments, the non-HDR image may be a standard dynamic range (SDR) image, but the disclosure should not be limited in this regard.

After step S100, step S110 is performed. In step S110, the image source received in the step S100 is detected whether it is a HDR image. If the image source is a HDR image, step S120 is performed next to step S110; otherwise, if the image source is a non-HDR image, for example a SDR image, step S111 is performed next to step S110.

In step S111, a second image adjustment value is read. That is, a SDR image adjustment value is correspondingly read by the image playback device according to a type of the received image source, e.g. SDR image. In some embodiments, the second image adjustment value includes at least one of a brightness value, a contrast value, a saturation value, and a hue value, but the disclosure should not be limited in this regard. Thereafter, step S112 is performed. In some embodiments, the image playback device may be a personal computer, a television, a notebook, or the like, but the disclosure should not be limited in this regard.

In step S112, color adjustment to the image source is performed according to the second image adjustment value. In some embodiments, the image playback device or the image capturing device performs color adjustment to the non-HDR image source according to the second image adjustment value, for example, the SDR image adjustment value, which is read in step S111. Thereafter, step S150 or step S170 is performed according to the purpose of recording and/or the purpose of preview respectively.

If the received image source in step S110 is a HDR image, step S120 is performed next to step S110. In step S120, determine whether to record the original HDR image source. In some embodiments, the user is allowed to choose whether to record the original HDR image source. If the original HDR image source is needed to be recorded, step S130 is performed. If the original HDR image source is not required to be recorded, step S121 is performed.

In step S121, a first image adjustment value is read. That is, a HDR image adjustment value is correspondingly read by the image playback device according to the received image source, e.g. HDR image. In some embodiments, the first image adjustment value includes at least one of a brightness value, a contrast value, a saturation value, and a hue value, but the disclosure should not be limited in this regard.

Step S122 is performed next to the step S121. In step S122, color adjustment to the image source is performed according to the first image adjustment value. In some embodiments, the image playback device or the image capturing device performs color adjustment to the HDR image source according to the first image adjustment value, for example, HDR image adjustment value, which is read in step S121. Thereafter, step S123 is performed.

In step S123, the adjusted HDR image is converted into a non-HDR image (for example, a SDR image). Thereafter, step S150 or step S170 is performed according to the purpose of recording and/or the purpose of preview respectively.

In some embodiments, if the image display device supports for displaying the HDR image, step S123 is selectively omissible. Accordingly, in such embodiments, in the process of displaying a preview image, step S170 may be directly executed after step S122.

In step S150, enable image capture function. In some embodiments, when the user confirms to record the image source, the image capture function of the image capturing device is enabled. Thereafter, step S160 is performed.

In step S160, record the non-HDR image. In some embodiments, the image capturing device records the original non-HDR image source (for example, SDR image), or the non-HDR image (for example, SDR image) which is converted from the original HDR image source in step S123.

In step S130, the original HDR image is output. In some embodiments, the image capturing device output the original HDR image source. Thereafter, step S140 and step S131 are performed according to the purpose of recording and/or the purpose of preview respectively.

In step S131, a first image adjustment value is read. That is, a HDR image adjustment value is correspondingly read by the image playback device according to the type of the received image source, e.g. HDR image. Thereafter, step S132 is performed.

In step S132, color adjustment to the image source is performed according to the first image adjustment value. In some embodiments, the image playback device or the image capturing device performs color adjustment to the HDR image source according to the first image adjustment value, for example, the HDR image adjustment value. Thereafter, step S133 is performed.

In step S133, the adjusted HDR image is converted into a non-HDR image (for example, a SDR image). Thereafter, step S170 is performed.

In some embodiments, if the display device supports displaying HDR images, step S133 is selectively omissible. Accordingly, in such embodiments, step S170 is directly performed next to step S132.

In some embodiments, if the display device supports displaying the HDR images, step S131 to step S133 are selectively omissible. Accordingly, in such embodiments, step S170 is directly performed next to step S130.

In step S140, enable image capture function. In some embodiments, when the user confirms to record the image source, the image capture function of the image capturing device is enabled. Thereafter, step S141 is performed.

In step S141, the image capture device star to record the original HDR image.

In step S170, a preview image of the image source is displayed on the display device. In some embodiments, the user is allowed to set and/or adjust the image adjustment value according to the preview image so as to adjust the quality of the image. In some embodiments, the display device may be a video display device, such as a screen, a television, a display or the like, but the disclosure should not be limited in this regard.

In step S180, continually detecting whether the image source is changed. In some embodiments, if the image source is changed, step S110 is performed again to determine whether the new image source is a HDR image or a non-HDR image (for example, a SDR image). Thereafter, the following steps are performed as discussed above and thus are not repeated here to avoid duplicity. In some embodiments, the image source may be dynamically changed. For example, the image source may be a HDR image at a first time and the image source may be a SDR image at a second time. In other embodiments, the image source is non-dynamically changed.

Figure 2:
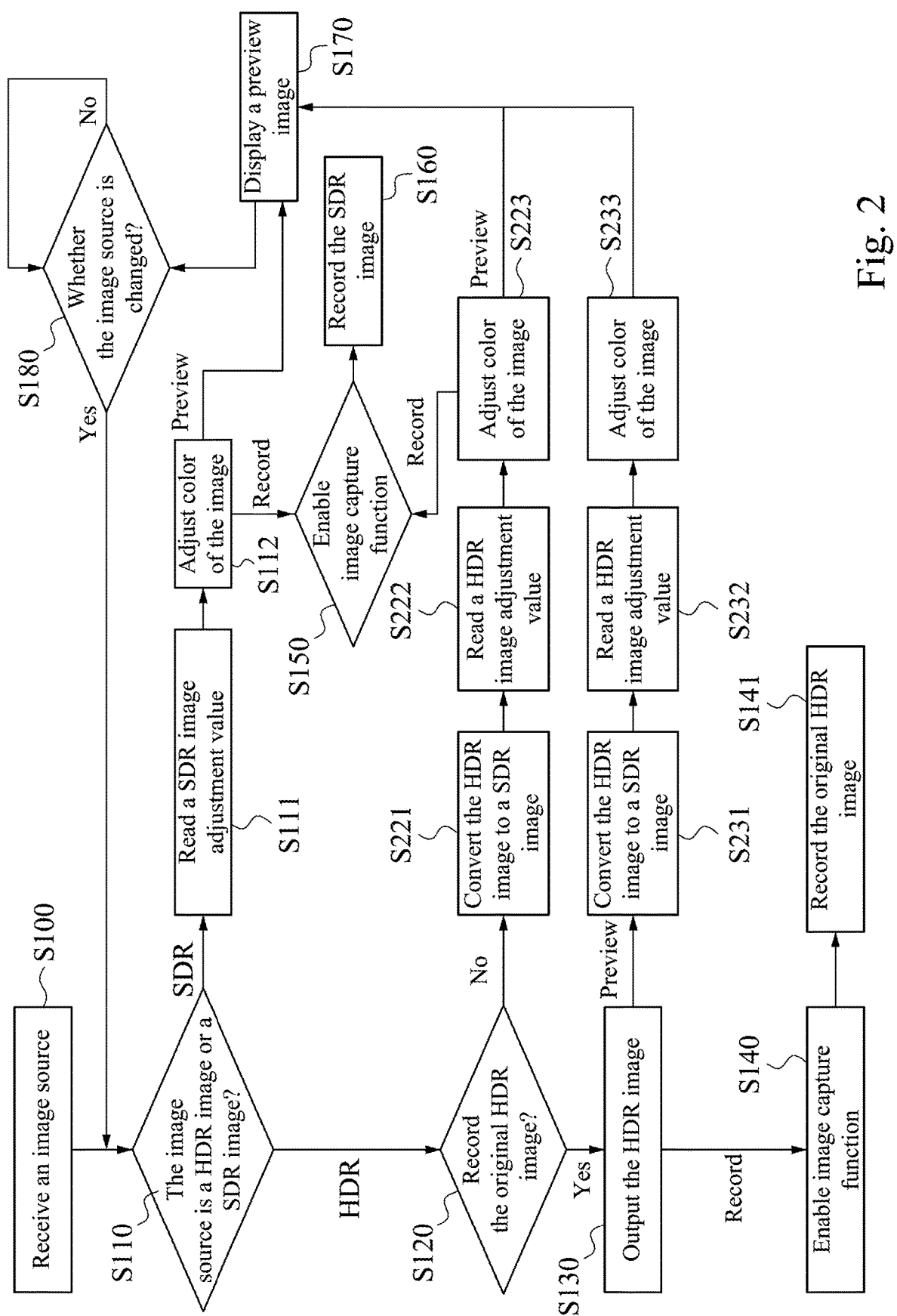
FIG. 2 is a flow chart of an image processing method according to another embodiment of the disclosure.

Reference is made to FIG. 2. FIG. 2 is a flow chart of an image processing method according to another embodiment of the disclosure. A difference between the image processing method of the present embodiment and the image processing method shown in FIG. 1 is that the image processing method of the present embodiment replaces step S121 to step S123 with step S221 to step S223 respectively, and replaces step S131 to step S133 with step S231 to step S233 respectively. Descriptions related to the rest of the same steps can be referred to the above similar descriptions and will not be repeated here for simplicity. In the following, step S221 to step S223 and step S231 to step S233 in the image processing method of the present embodiment will be described in detail.

In step S221 to step S223, after the HDR image is converted into a non-HDR image (for example, a SDR image), the image playback device or the image capture device correspondingly reads a first image adjustment value according to the type of the received image source, e.g. HDR image. Then, the image playback device or the image capturing device performs color adjustment to the converted non-HDR image according to the first image adjustment value. Thereafter, step S150 or step S170 is performed according to the purpose of recording and/or the purpose of preview respectively.

In step S231 to step S233, after the HDR image is converted into a non-HDR image (for example, a SDR image), the image playback device or the image capture device correspondingly reads a first image adjustment value according to the received image source, e.g. HDR image. Then, the image playback device or the image capturing device performs color adjustment to the converted non-HDR image according to the first image adjustment value. Thereafter, step S170 is performed.

Therefore, in the embodiment, the original HDR image source can be converted into a non-HDR image (for example, a SDR image) first, and then the color of the converted image is adjusted according to the first image adjustment value. Finally, the adjusted image is previewed on the display device.

In the above two embodiments, when the image source is a HDR image, the color adjustment is performed to the image source and the display device according to the first image adjustment value. When the image source is a non-HDR image (for example, SDR image), the color adjustment is performed to the image source and the display device according to the second image adjustment value. In some embodiments, the first image adjustment value includes at least one of a brightness value, a contrast value, a saturation value, and a hue value. In some embodiments, the second image adjustment value includes at least one of a brightness value, a contrast value, a saturation value, and a hue value. In some embodiments, the first image adjustment value and the second image adjustment value may be defined by users, or one or more preset value. In some embodiments, the first image adjustment value and the second image adjustment value may be the same, different, or there is a functional relationship between the first image adjustment value and the second image adjustment value. The disclosure should not be limited in this regard.

It is to be understood that the image recording discussed above may refer to any form of image or video stream production, such as image compression, image capture, image output, image archive, or the like. The disclosure should not be limited in this regard.

Accordingly, if the received image source is HDR image, according to the image processing method of the present disclosure, read a first image adjustment value. According to the first image adjustment value, perform the color adjustment to the display device or to the image source. As such, the deviation problem of the image can be solved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image processing method, comprising:
    receiving an image source;
    detecting whether the image source is a high dynamic range (HDR) image;
    if the image source is the HDR image, determining whether to record an original HDR image;
    if the original HDR image needs to be recorded, outputting the original HDR image, and preview and record the original HDR image;
    reading a first image adjustment value, performing color adjustment to the original HDR image according to the first image adjustment value, and displaying a preview image of the original HDR image on a display device after performing color adjustment; and
    before performing color adjustment to the image source according to the first image adjustment value, recording the original HDR image.

2. The method of claim 1, further comprising:
    if the image source is a non-HDR image, reading a second image adjustment value; and
    performing color adjustment to the image source according to the second image adjustment value.

3. The method of claim 2, wherein the second image adjustment value comprises at least one of a brightness value, a contrast value, a saturation value, and a hue value.

4. The method of claim 1, further comprising:
    after performing color adjustment to the image source according to the first image adjustment value, converting the image source from the HDR image to a non-HDR image.

5. The method of claim 4, wherein performing color adjustment to the image source comprises performing color adjustment to the HDR image according to the first image adjustment value.

6. The method of claim 1, further comprising:
    before performing color adjustment to the image source according to the first image adjustment value, converting the image source from the HDR image to a non-HDR image.

7. The method of claim 6, wherein performing color adjustment to the image source comprises performing color adjustment to the non-HDR image according to the first image adjustment value.

8. The method of claim 1, further comprising:
    enabling image capture function to record the adjusted image source.

9. The method of claim 1, further comprising:
    before record the original HDR image, enabling image capture function.

10. The method of claim 1, further comprising:
if the original HDR image does not need to be recorded, enabling image capture function to record a non-HDR image;
displaying a preview image of the non-HDR image on the display device.

11. The method of claim 1, further comprising:
determining whether the display device supports displaying the HDR image; and
if the display device does not support displaying the HDR image, converting the image source from the HDR image to a non-HDR image.

12. The method of claim 1, wherein the first image adjustment value comprises at least one of a brightness value, a contrast value, a saturation value, and a hue value.

13. The method of claim 1, further comprising:
continually detecting whether the image source is changed.

\* \* \* \* \*